(12) United States Patent
Ventrapragada et al.

(10) Patent No.: US 9,743,146 B2
(45) Date of Patent: Aug. 22, 2017

(54) VIDEO ON DEMAND PLATFORM

(71) Applicant: Verizon Patent and Licensing Inc., Arlington, VA (US)

(72) Inventors: Nagaviswas Ventrapragada, Coppell, TX (US); Nageswara Raju Dachiraju, Irving, TX (US); Jesus Martinez, Coppell, TX (US); Mukunda P. Raju, Irving, TX (US); Tulasi Kumar Neeli, Irving, TX (US); Rajasekhar V. Tulasi, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/840,667

(22) Filed: Aug. 31, 2015

(65) Prior Publication Data

US 2017/0064398 A1 Mar. 2, 2017

(51) Int. Cl.
| | |
|---|---|
| *H04N 7/16* | (2011.01) |
| *H04N 21/4784* | (2011.01) |
| *H04N 21/472* | (2011.01) |
| *H04N 21/475* | (2011.01) |
| *G06Q 30/00* | (2012.01) |

(52) U.S. Cl.
CPC ......... *H04N 21/4784* (2013.01); *G06Q 30/00* (2013.01); *H04N 21/4755* (2013.01); *H04N 21/47202* (2013.01)

(58) Field of Classification Search
USPC .......................................... 725/23
See application file for complete search history.

(56) References Cited

U.S. PATENT DOCUMENTS

| | | | | |
|---|---|---|---|---|
| 7,970,649 B2* | 6/2011 | Wu | ........................ | G06Q 30/02 705/14.53 |
| 2007/0061834 A1* | 3/2007 | Guillorit | ................ | G06Q 10/10 725/23 |
| 2012/0123924 A1* | 5/2012 | Rose | ...................... | G06Q 20/12 705/35 |
| 2012/0141095 A1* | 6/2012 | Schwesinger | ........ | H04N 21/431 386/290 |
| 2014/0012652 A1* | 1/2014 | Levin | ................. | G06Q 30/0233 705/14.31 |
| 2016/0078465 A1* | 3/2016 | Chai | .................. | G06Q 30/0226 705/14.27 |

* cited by examiner

*Primary Examiner* — Mulugeta Mengesha

(57) ABSTRACT

A device provides, to a user device, a list of on demand content available for purchase or rental from the device, and receives, from the user device, an indication of a selected on demand content from the list of on demand content. The device provides, to the user device, points-based purchase or rental options for the selected on demand content, and the points-based purchase or rental options include points associated with a loyalty program provided by the device for a user of the user device. The device receives, from the user device, a selected points-based option from the points-based purchase or rental options, and provides the selected on demand content to the user device based on the selected points-based option.

20 Claims, 14 Drawing Sheets

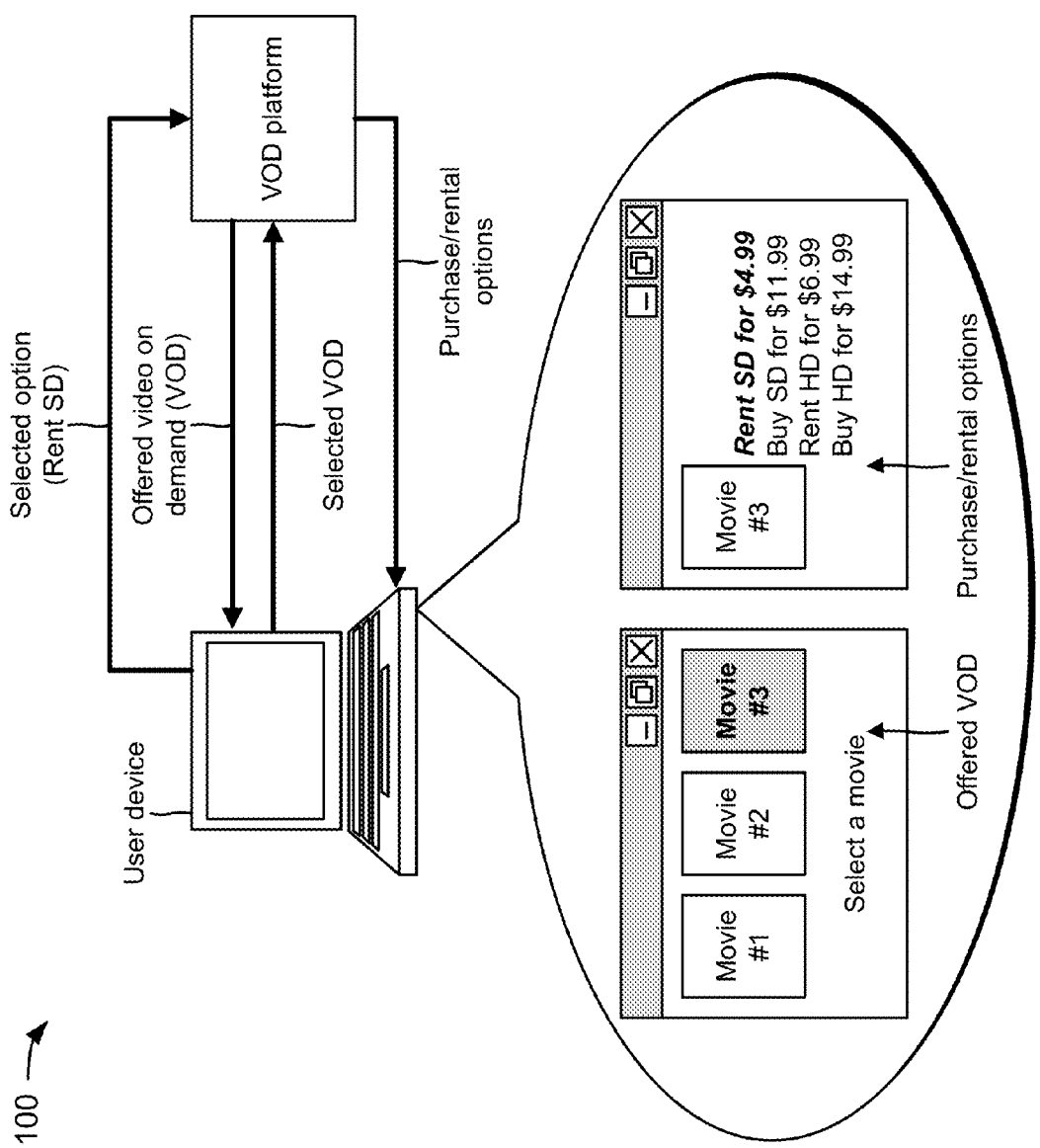

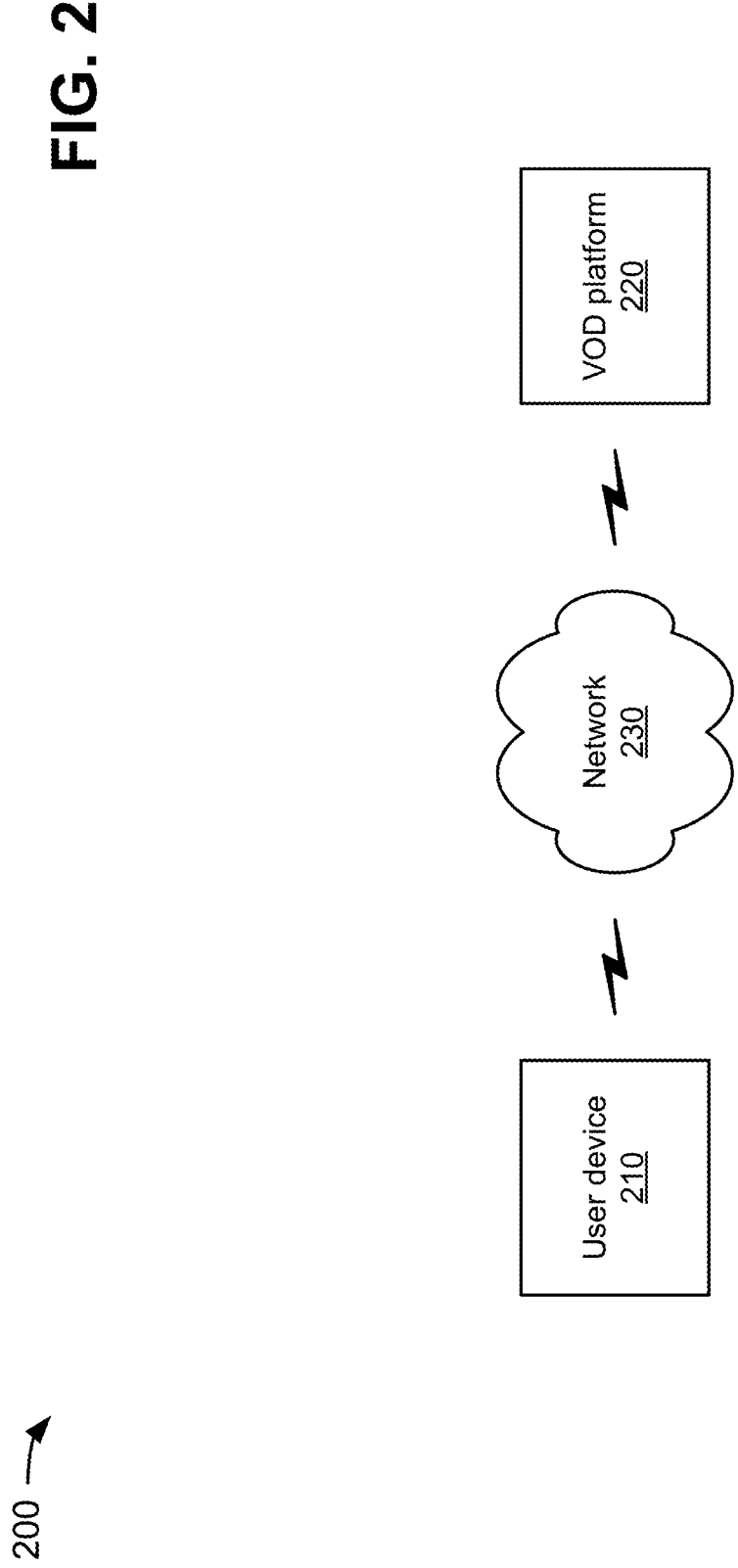

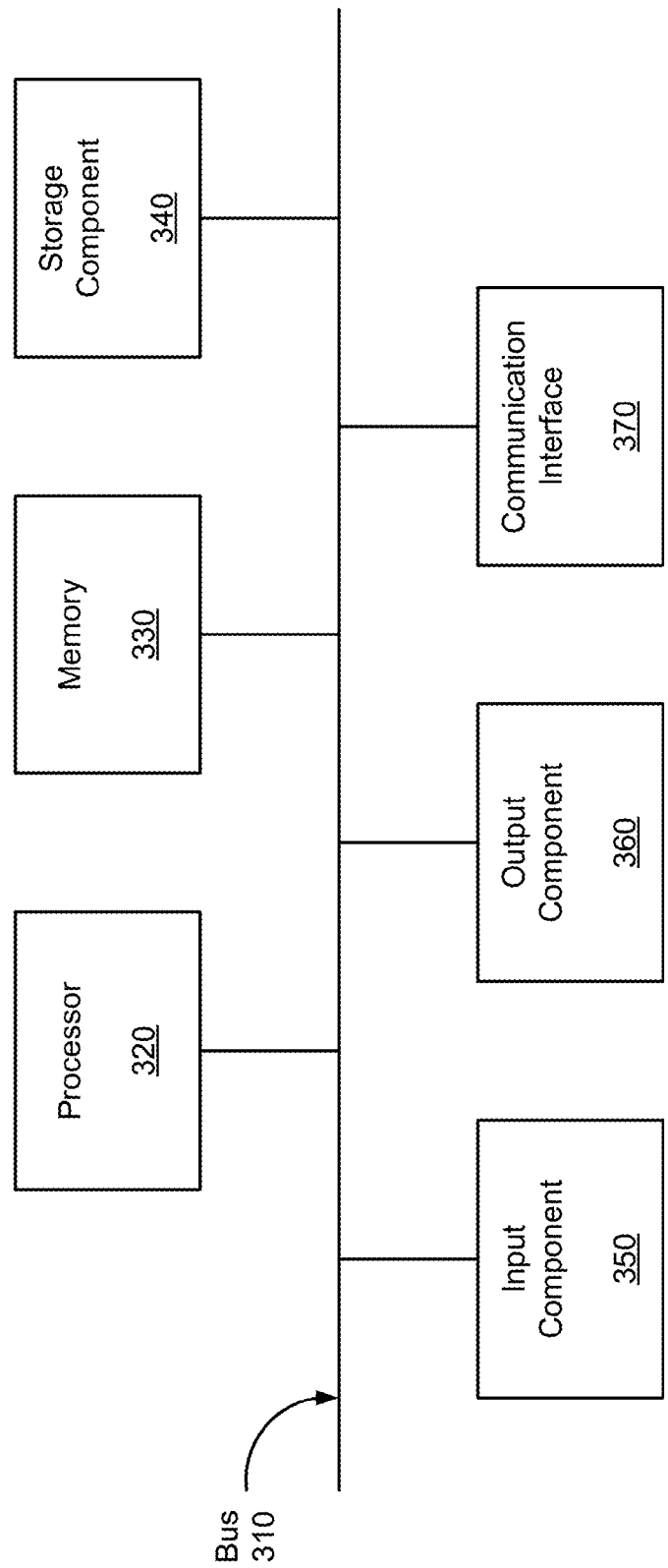

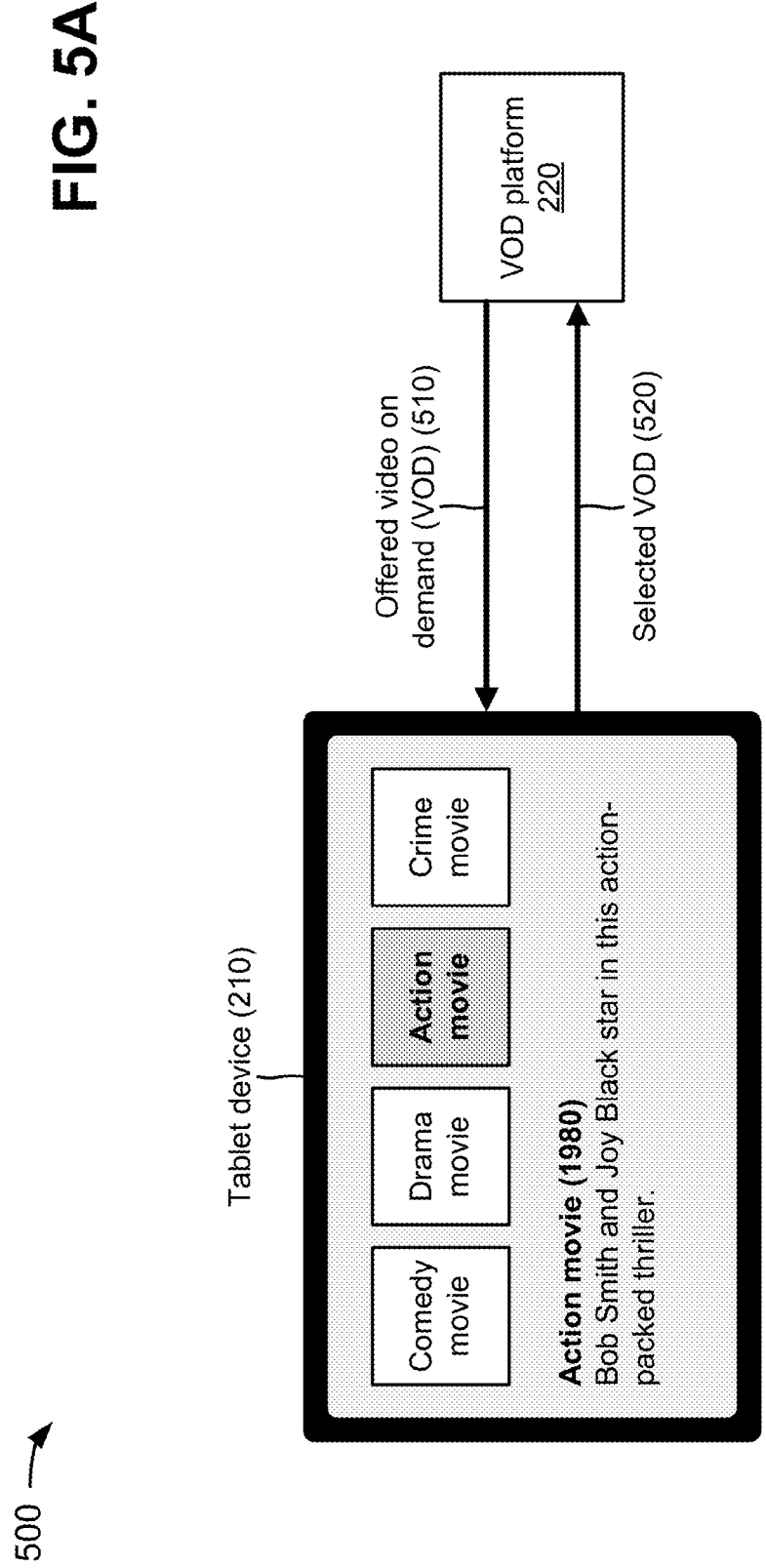

FIG. 7B

Your Earned Points

| DESCRIPTION | POST DATE | POINTS EARNED |
|---|---|---|
| Enroll in Auto Pay | May 7, 2015 | 100 pts |
| VOD Purchase | May 1, 2015 | 100 pts |
| Bill Pay | Apr 27, 2015 | 150 pts |
| Happy Birthday | Apr 10, 2015 | 200 pts |
| Lorem Ipsum | Mon XX, YYYY | 100 pts |
| Lorem Ipsum | Mon XX, YYYY | 100 pts |
| Lorem Ipsum | Mon XX, YYYY | 100 pts |
| Enrollment Reward | Mar 21, 2015 | 100 pts |

LIFETIME POINTS
88,000

CURRENT POINTS
15,000

720

700

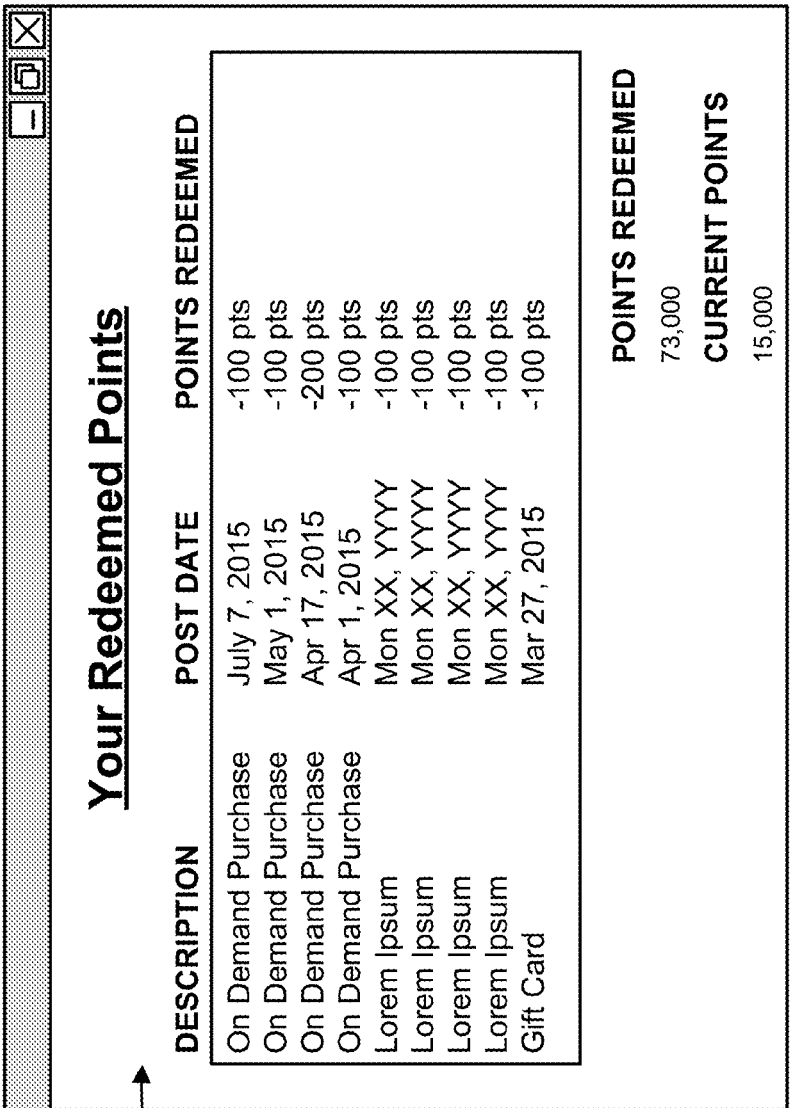

VIDEO ON DEMAND PLATFORM

BACKGROUND

Loyalty programs are structured marketing efforts that reward, and therefore encourage, loyal buying behavior that may be beneficial to an entity (e.g., a company, an organization, or the like). For example, in retail, a customer may utilize a loyalty card, a rewards card, a points card, an advantage card, a club card, or the like to identify the customer as a member in a loyalty program. The customer may utilize such cards to receive a discount for a current purchase, or to receive an allotment of points that can be used for future purchases. Loyalty programs can be viewed as virtual currency with unidirectional cash flow, since points can be exchanged into a good or a service but not back into cash.

BRIEF DESCRIPTION OF THE DRAWINGS

FIGS. 1A and 1B are diagrams of an overview of an example implementation described herein;

FIG. 2 is a diagram of an example environment in which systems and/or methods, described herein, may be implemented;

FIG. 3 is a diagram of example components of a device that may correspond to one or more of the devices of the environment depicted in FIG. 2;

FIGS. 5A-5D are diagrams of an example relating to the example process shown in FIG. 4;

FIGS. 7A-7C are diagrams of example user interfaces associated with a points-based system for purchasing and/or renting video on demand.

DETAILED DESCRIPTION OF PREFERRED EMBODIMENTS

The following detailed description refers to the accompanying drawings. The same reference numbers in different drawings may identify the same or similar elements.

A video on demand (VOD) system is a system that allows customers to select and access video and/or audio content when the customers choose to, rather than having to access the video and/or audio content at a specific broadcast time. A VOD system can stream content through a set-top box, a computer, a mobile device, or the like, to allow access to the content in real time. Alternatively, a VOD system may permit the content to be downloaded to a device, such as a computer, a digital video recorder (DVR), a portable media player, or the like, for access at any time. VOD content providers, such as a telecommunications service providers, television service providers, Internet service providers, web site operators, or the like, may offer both VOD content streaming and VOD content downloading. The VOD content providers may offer loyalty programs that enable customers to utilize awarded points to purchase gift cards. However, the gift cards may be used to purchase goods and/or services from entities other than the VOD content providers.

Systems and/or methods, described herein, may provide a VOD platform that enables VOD content to be purchased or rented using points associated with a loyalty program offered by the VOD platform, rather than for a monetary fee. The VOD platform may enable the VOD content to be purchased or rented using a combination of points and a monetary fee. The VOD platform may enable VOD content, such as on demand video content, on demand audio content, pay per view video and/or audio content, broadcast television content, or the like, to be purchased or rented using the points. The VOD platform may permit specific VOD content to be purchased or rented only with the points, and may not permit the specific VOD content to be purchased or rented for a monetary fee to encourage enrollment in the loyalty program. The VOD platform may enable a group of VOD content (e.g., a bundle of movies) to be purchased or rented with the points, and may utilize an electronic program guide (EPG) to manage the points associated with the loyalty program. The VOD platform may reward customer loyalty with the points, and may enable a VOD content provider to retain customers. The VOD platform may award points based on specific customer behavior (e.g., self-service correction of a problem encountered by the customer, which may reduce service calls). The VOD platform may increase customer satisfaction, and may encourage customers to purchase or rent VOD content.

Figure 1B:
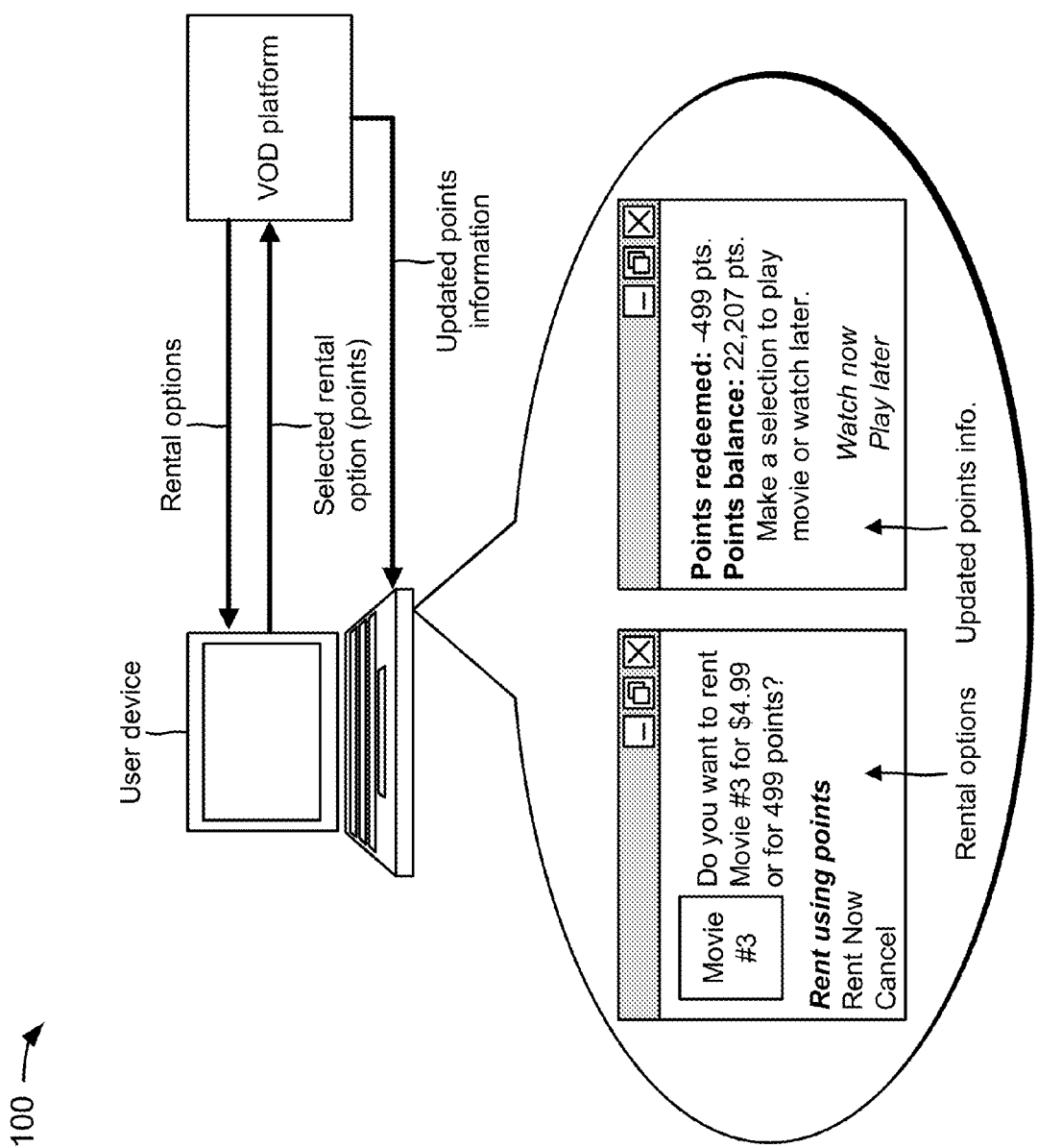

FIGS. 1A and 1B are diagrams of an overview of an example implementation 100 described herein. As shown in FIG. 1A, assume that a user device (e.g., a laptop computer, a notebook computer, or the like) receives, from a VOD platform, information associated with VOD content (e.g., a listing of movies) offered by a VOD content provider, and displays the information to a user of the user device. The user of user device may be a customer of the VOD platform and/or a customer of a VOD content provider associated with the VOD platform. Further, assume that the user selects one of the offered VOD content (e.g., Movie#3) from the displayed information, and that the user device provides an indication of the selected VOD content to the VOD platform. Based on the selected VOD content, the VOD platform may provide purchase and rental options for the selected VOD content to the user device, and the user device may display the purchase and rental options to the user. As further shown in FIG. 1A, the user may select one of the purchase and rental options (e.g., rent Movie#3 in a standard definition (SD) or standard quality format for $4.99), and the user device may provide an indication of the selected purchase and rental option to the VOD platform.

As shown in FIG. 1B, based on the selected purchase and rental option, the VOD platform may provide rental options to the user device, and the user device may display the rental options to the user. The user may select one of the rental options (e.g., Rent using 499 points associated with the user's loyalty program account), and the user device may provide an indication of the selected rental option to the VOD platform. Based on the selected rental option, the VOD platform may provide Movie#3, in a standard definition format and for a rental time period, to the user device, and may update points associated with the user's loyalty program account (e.g., may deduct 499 points from the account). As further shown in FIG. 1B, the VOD platform may provide updated points information to the user device, and the user device may display the updated points information to the user. The updated points information may indicate that the user redeemed 499 points for the rental of Movie#3, and that the user's loyalty program account has a balance of 22,207 points.

Systems and/or methods, described herein, may provide a VOD platform that enables VOD content to be purchased or rented using points associated with a loyalty program offered by the VOD platform, rather than or in addition to a monetary fee. The systems and/or methods may reward customer loyalty with the points, and may enable a VOD content provider to retain customers. The systems and/or methods may award points based on specific customer behavior, may increase customer satisfaction, and may encourage customers to purchase or rent VOD content.

FIG. 2 is a diagram of an example environment 200 in which systems and/or methods, described herein, may be implemented. As illustrated, environment 200 may include a user device 210, a VOD platform 220, and a network 230. Devices of environment 200 may interconnect via wired connections, wireless connections, or a combination of wired and wireless connections.

User device 210 may include a device that is capable of communicating over network 230 with VOD platform 220. In some implementations, user device 210 may include a radiotelephone; a personal communications services (PCS) terminal that may combine, for example, a cellular radiotelephone with data processing and data communications capabilities; a smart phone; a notebook computer; a laptop computer; a tablet device; a set-top box (STB), digital video recorder (DVR), a portable media player, a television, or another type of computation and communication device.

VOD platform 220 may include one or more devices capable of receiving, generating, storing, processing, and/or providing information, such as information described herein. For example, VOD platform 220 may include one or more personal computers, one or more workstation computers, one or more server devices, one or more virtual machines (VMs) provided in a cloud computing environment, or one or more other types of computation and communication devices. In some implementations, VOD platform 220 may be associated with a network service provider that manages and/or operates network 230, such as, for example, a telecommunication service provider, a television service provider, an Internet service provider, or the like.

Network 230 may include one or more wired and/or wireless networks. For example, network 230 may include a cellular network (e.g., a long term evolution (LTE) network, a third generation (3G) network, a code division multiple access (CDMA) network, or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and/or networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300. Device 300 may correspond to user device 210 and/or VOD platform 220. In some implementations, user device 210 and/or VOD platform 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interpret and executes instructions and can be programmed to perform a function. Processor 320 may include one or more processors. Memory 330 may include a random access memory (RAM), a read only memory (ROM), and/or another type of dynamic or static storage device (e.g., a flash memory, a magnetic memory, an optical memory, or the like) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, or the like), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, or the like). Additionally, or alternatively, input component 350 may include a sensor for sensing information (e.g., a global positioning system (GPS) component, an accelerometer, a gyroscope, an actuator, or the like). Output component 360 may include a component that provides output information from device 300 (e.g., a display, a speaker, one or more light-emitting diodes (LEDs), or the like).

Communication interface 370 may include a transceiver-like component (e.g., a transceiver, a separate receiver and transmitter, or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
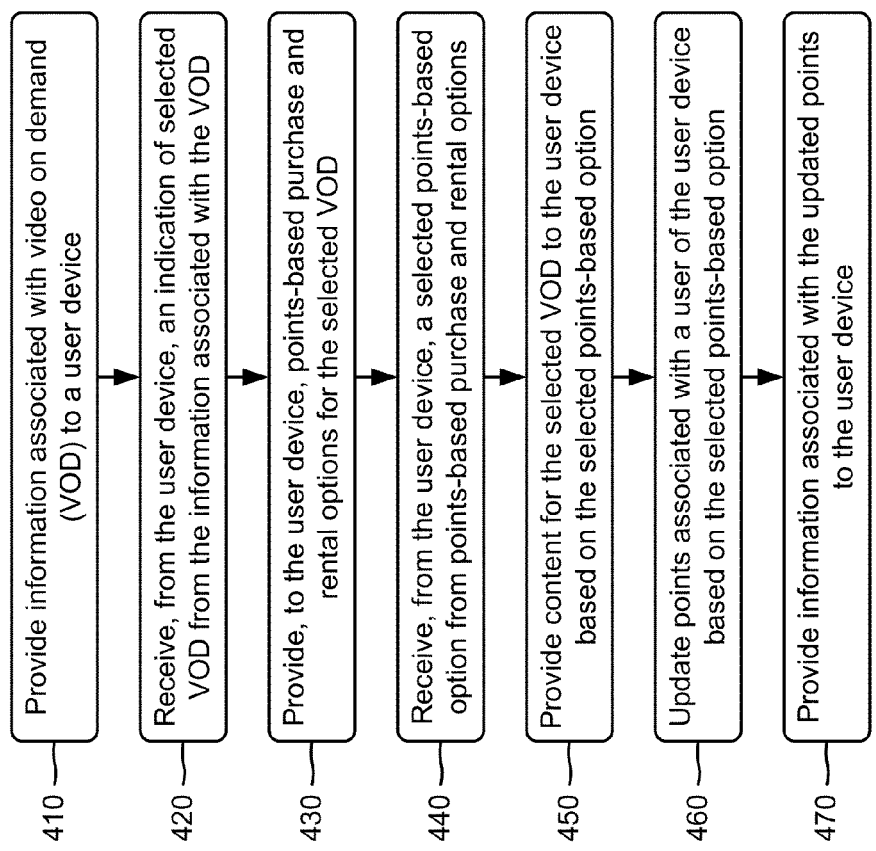
FIG. 4 is a flow chart of an example process for purchasing and/or renting video on demand via a points-based system.

FIG. 4 is a flow chart of an example process 400 for purchasing and/or renting video on demand via a points-based system, such as a loyalty program. In some implementations, one or more process blocks of FIG. 4 may be performed by VOD platform 220. In some implementations, one or more process blocks of FIG. 4 may be performed by another device or a group of devices separate from or including VOD platform 220, such as user device 210.

As shown in FIG. 4, process 400 may include providing information associated with video on demand (VOD) to a user device (block 410). For example, VOD platform 220 may provide, to user device 210, information associated with VOD offered by VOD platform 220. In some implementations, a user may utilize user device 210 to request the information associated with the VOD from VOD platform 220. VOD platform 220 may provide the information associated with the VOD to user device 210 based on the request, and user device 210 may display the information associated with the VOD to the user. In some implementations, the information associated with the VOD may include a list of VOD content available for purchase or rental from VOD platform 220. For example, the list of VOD content may include a list of content, such as movies, television episodes, songs, concerts, games, or the like, available for purchase or rental, purchase costs associated with the listed content, rental costs associated with the listed content, information about the listed content (e.g., parental ratings, durations, actors, or the like), images associated with the listed content, trailers associated with the listed content, or the like.

In one example, assume that the user utilizes a set-top box 210, and an electronic program guide provided by set-top box 210 on a television, to request the information associated with the VOD from VOD platform 220. Based on the request, VOD platform 220 may provide a list of VOD content available for purchase or rental to set-top box 210, and set-top box 210 may utilize the television to display the list of VOD content in the electronic program guide. In another example, assume that the user utilizes a computer 210 to access a web page provided by VOD platform 220. The web page may include the information associated with the VOD, or may enable the user to request the information associated with the VOD via computer 210. Based on the request, VOD platform 220 may provide a list of VOD content available for purchase or rental to computer 210, and computer 210 may display the list of VOD content to the user.

As further shown in FIG. 4, process 400 may include receiving, from the user device, an indication of a selected VOD from the information associated with the VOD (block 420). For example, the user may utilize user device 210 to select VOD from the information associated with the VOD. User device 210 may provide, to VOD platform 220, an indication of the selected VOD, and VOD platform 220 may receive the indication of the selected VOD. In some implementations, user device 210 may display a list of VOD content (e.g., a list of movies) available for purchase or rental, and the user may utilize user device 210 to select VOD content (e.g., a particular movie) from the list of movies. User device 210 may provide an indication of the particular movie to VOD platform 220, and VOD platform 220 may receive the indication of the particular movie.

For example, the user may utilize set-top box 210 and a television to view the list of VOD content, and may utilize a remote control, communicating with set-top box 210, to select VOD content from the list of VOD content. Once the VOD content is selected, set-top box 210 may provide an indication of the selected VOD content to VOD platform 220, and VOD platform 220 may receive the indication of the selected VOD. In another example, the user may utilize a smart phone 210 to view the list of VOD content and to select VOD content from the list of VOD content. Once the VOD content is selected, smart phone 210 may provide an indication of the selected VOD content to VOD platform 220, and VOD platform 220 may receive the indication of the selected VOD.

As further shown in FIG. 4, process 400 may include providing, to the user device, points-based purchase and rental options for the selected VOD (block 430). For example, VOD platform 220 may provide, to user device 210, points-based purchase and rental options for the selected VOD. In some implementations, the points-based purchase and rental options may be associated with a loyalty program, and may enable the user to purchase or rent the selected VOD with points rather than with money. In some implementations, the loyalty program and the points-based purchase and rental options may not include content provider-based restrictions, user-based restrictions, time-based restrictions, or the like, on the use of the points. For example, the loyalty program may not limit the use of points to gift cards, may enable points to be shared with other users, may not cause points to expire after a period of time, or the like.

In some implementations, the points-based purchase and rental options may enable the selected VOD content to be purchased or rented using a combination of points and a monetary fee. In some implementations, the points-based purchase and rental options may permit specific VOD content to be purchased or rented only with the points, and may not permit the specific VOD content to be purchased or rented for a monetary fee. In some implementations, the points-based purchase and rental options may enable a group of VOD content (e.g., a group of television episodes) to be purchased or rented with the points. In some implementations, the points-based purchase and rental options may increase participation in the loyalty program, which may save processing resources associated with VOD platform 220. For example, the points-based purchase and rental options may save processing resources since VOD platform 220 may not have to generate a bill for purchases and/or rentals, verify a user for payment of purchases and/or rentals, verify payment for purchases and/or rentals, or the like. In another example, the points-based purchase and rental options may save processing resources since the points can be used to purchase other services the conserve processing resources, such as automatic billing, electronic billing, or the like.

In some implementations, VOD platform 220 may cause user device 210 to prompt the user to enter credentials (e.g., a user name, a personal identification number, or the like), indicating that the user is associated with the loyalty program, before providing the points-based purchase and rental options to user device 210. In some implementations, VOD platform 220 may cause user device 210 to request that the user acknowledge that the user is an authorized account holder and willing to utilize the loyalty program's points, before providing the points-based purchase and rental options to user device 210.

In one example, assume that the user utilizes user device 210 to select a movie as the selected VOD content. Based on the selected movie, VOD platform 220 may provide points-based purchase options for the movie (e.g., purchase in standard definition for 399 points, purchase in high definition for 699 points, or the like) and points-based rental options for the movie (e.g., rent in standard definition for 199 points, rent in high definition for 499 points, or the like) to user device 210. User device 210 may display, to the user, the points-based purchase options and the points-based rental options for the movie.

As further shown in FIG. 4, process 400 may include receiving, from the user device, a selected points-based option from the points-based purchase and rental options (block 440). For example, the user may utilize user device 210 to select a points-based option from the points-based purchase and rental options for the selected VOD. User device 210 may provide, to VOD platform 220, the selected points-based option, and VOD platform 220 may receive the selected points-based option.

In some implementations, the user may utilize set-top box 210 and a television to view the points-based purchase and rental options for the selected VOD, and may utilize a remote control, communicating with set-top box 210, to select a points-based option from the points-based purchase and rental options. Once the points-based option is selected, set-top box 210 may provide an indication of the selected point-based option to VOD platform 220, and VOD platform 220 may receive the indication of the selected points-based option. In some implementations, the user may utilize a tablet device 210 to view the points-based purchase and rental options for the selected VOD and to select a points-based option from the points-based purchase and rental options. Once the points-based option is selected, tablet device 210 may provide an indication of the selected points-based option to VOD platform 220, and VOD platform 220 may receive the indication of the selected points-based option.

As further shown in FIG. 4, process 400 may include providing content for the selected VOD to the user device based on the selected points-based option (block 450). For example, VOD platform 220 may provide content for the selected VOD to user device 210 based on the selected points-based option. In some implementations, if the selected points-based option is a rental option for particular VOD content, VOD platform 220 may provide the particular VOD content to user device 210 for a particular rental time period (e.g., in hours, days, or the like), for a particular number of views (e.g., one view, two views, or the like), or the like. In some implementations, if the selected points-based option is a purchase option for particular VOD content, VOD platform 220 may provide the particular VOD content to user device 210 upon request. In such implementations, VOD platform 220 may enable user device 210 to download and store the particular VOD content. Alternatively, VOD platform 220 may store the particular VOD content, and may associate the particular VOD content with the user so that the user may request and receive the particular VOD content, via user device 210, at any time.

In one example, assume that the user utilizes user device 210 to select a movie as the selected VOD content, and to purchase the movie in a standard definition format for 399 points. Based on these selections, VOD platform 220 may enable user device 210 to download the movie for a cost of 399 points that is deducted from the user's loyalty program account. In another example, assume that the user utilizes user device 210 to select a television episode as the selected VOD content, and to rent the television episode in a high definition format for 499 points. Based on these selections, VOD platform 220 may enable user device 210 to view the television episode for twenty-four hours and for a cost of 499 points that is deducted from the user's loyalty program account.

As further shown in FIG. 4, process 400 may include updating points associated with a user of the user device based on the selected points-based option (block 460). For example, VOD platform 220 may update points associated with the user of user device 210 based on the selected points-based option. In some implementations, if the selected points-based option is a rental option for particular VOD content, VOD platform 220 may deduct points, for renting the particular VOD content, from the user's loyalty program account. In some implementations, if the selected points-based option is a purchase option for particular VOD content, VOD platform 220 may deduct points, for purchasing the particular VOD content, from the user's loyalty program account. In some implementations, if the selected points-based option is an option for using points and money to purchase/rent particular VOD content, VOD platform 220 may deduct points, for purchasing/renting the particular VOD content, from the user's loyalty program account, may add a billing charge, for purchasing/renting the particular VOD content, to the user's billing account associated with the service that VOD platform 220 provides to the user, or receive a payment (e.g., via credit or debit).

In one example, assume that the user utilizes user device 210 to select a movie as the selected VOD content, and to purchase the movie in a high definition format for 999 points. Based on these selections, VOD platform 220 may deduct 999 points from the user's loyalty program account. In another example, assume that user elects to purchase the movie in a high definition format for 599 points and $4.00. In such an example, VOD platform 220 may deduct 599 points from the user's loyalty program account, and may add a billing charge of $4.00 to the user's billing account. In still another example, assume that the user utilizes user device 210 to select a television episode as the selected VOD content, and to rent the television episode in a high definition format for 199 points. Based on these selections, VOD platform 220 may deduct 199 points from the user's loyalty program account.

In some implementations, VOD platform 220 may offer VOD content for purchase or rental for an amount of points that is less than an amount of dollars. For example, if one point is equivalent to one cent, VOD platform 220 may offer a movie for a purchase price of 499 points or $5.99. In some implementations, VOD platform 220 may permit the user to utilize points for other services associated with environment 200, such as increasing a bandwidth allocated to the user, upgrading a quality of service (QoS) allocated to the user, increasing download speeds for the user, or the like. In some implementations, VOD platform 220 may award points or refund points to the user when the user upgrades a VOD transaction (e.g., from a rental to a purchase, from a standard definition format to a high definition format, or the like).

As further shown in FIG. 4, process 400 may include providing information associated with the updated points to the user device (block 470). For example, VOD platform 220 may provide information associated with the updated points to user device 210, and user device 210 may display the information associated with the updated points. In some implementations, the information associated with the updated points may include a current points balance, an earned points balance, a redeemed points balance, a lifetime points balance, or the like. In some implementations, the information associated with the updated points may enable the user to manage the user's loyalty program by, for example, earning more points, utilizing points for other services, transferring points to another user, receiving points from another user, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
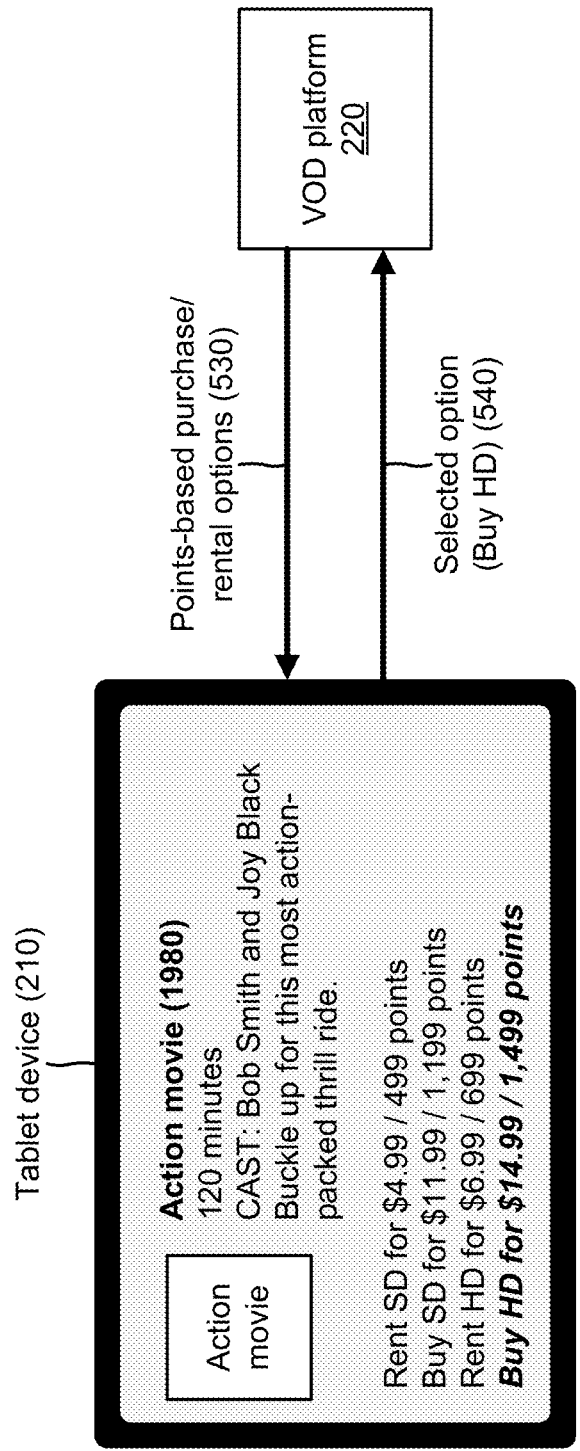

FIGS. 5A-5D are diagrams of an example 500 relating to example process 400 shown in FIG. 4. As shown in FIG. 5A, assume that VOD platform 220 provides, to a tablet device 210, information associated with VOD offered by VOD platform 220, as indicated by reference number 510. The information associated with the offered VOD may include a list of movies, such as a Comedy movie, a Drama movie, an Action movie, and a Crime movie. Further, assume that tablet device 210 receives the list of movies and displays the list of movies in a user interface, and that a user of tablet device 210 utilizes the user interface to select a movie from the list of movies. For example, assume that the user selects the Action movie from the user interface, as shown in FIG. 5A. Based on the selection, tablet device 210 may provide an indication 520 of the selected Action movie to VOD platform 220, and VOD platform 220 may receive indication 520.

As shown in FIG. 5B, based on indication 520, VOD platform 220 may provide points-based purchase and rental options 530 for the Action movie to tablet device 210. Tablet device 210 may receive points-based purchase and rental options 530, and may display points-based purchase and rental options 530 in a user interface. As shown in the user interface, points-based purchase and rental options 530 may include a standard definition (SD) or standard quality rental option for the Action movie that costs $4.99 or 499 points; a SD purchase option for the Action movie that costs $11.99 or 1,199 points; a high definition (HD) or high quality rental option for the Action movie that costs $6.99 or 699 points; and a HD purchase option for the Action movie that costs $14.99 or 1,499 points. The user interface may also include information associated with the Action movie, such as, for example, a release date (e.g., 1980), a duration (e.g., 120 minutes), cast information, a brief description, or the like. As further shown in FIG. 5B, assume that the user selects the HD purchase option from the user interface. Based on the selection, tablet device 210 may provide an indication 540 of the selected HD purchase option to VOD platform 220, and VOD platform 220 may receive indication 540.

Figure 5C:
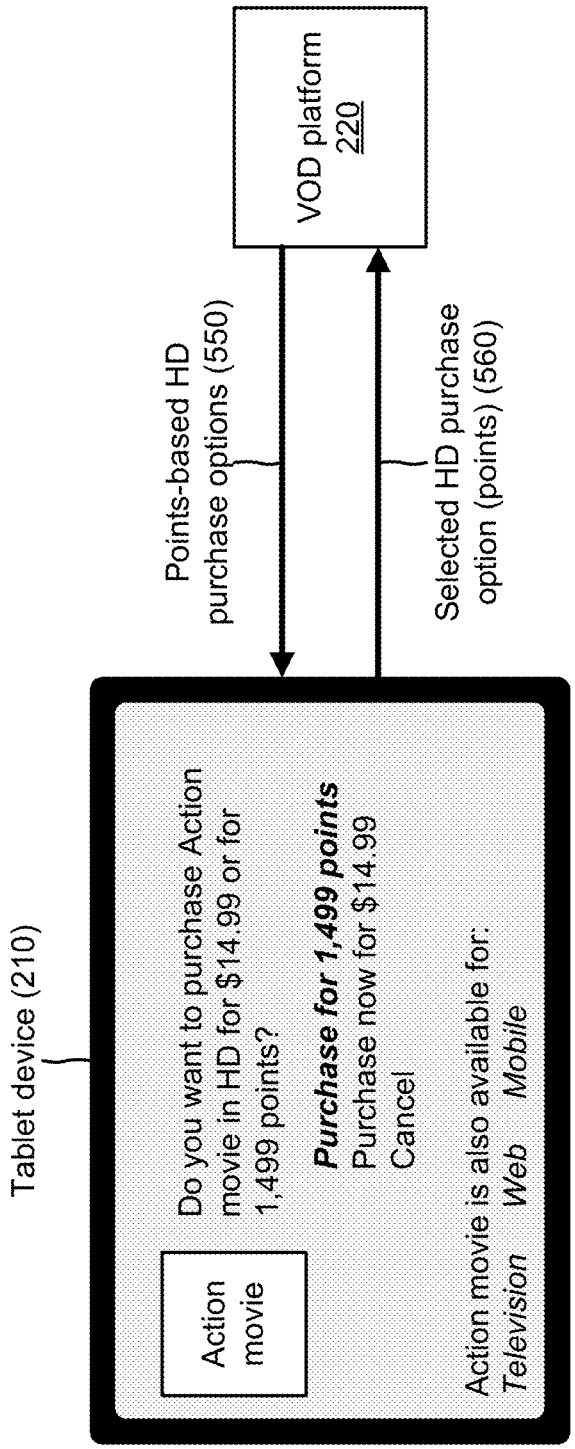

As shown in FIG. 5C, based on indication 540, VOD platform 220 may provide points-based HD purchase options 550 for the Action movie to tablet device 210. Tablet device 210 may receive points-based HD purchase options 550, and may display points-based HD purchase options 550 in a user interface. As shown in the user interface, points-based HD purchase options 550 may include an option to purchase the Action movie for 1,499 points, an option to purchase the Action movie for $14.99, and a cancel option (e.g., if the user decides not to purchase the Action movie). The user interface may indicate that the Action movie is also available for television (e.g., via a set-top box), for the web (e.g., via a computing device), and/or for mobile (e.g., a smart phone). As further shown in FIG. 5C, assume that the user selects, from the user interface, the option to purchase the Action movie for 1,499 points. Based on the selection, tablet device 210 may provide an indication 560 of the 1,499 points purchase option to VOD platform 220, and VOD platform 220 may receive indication 560.

Figure 5D:
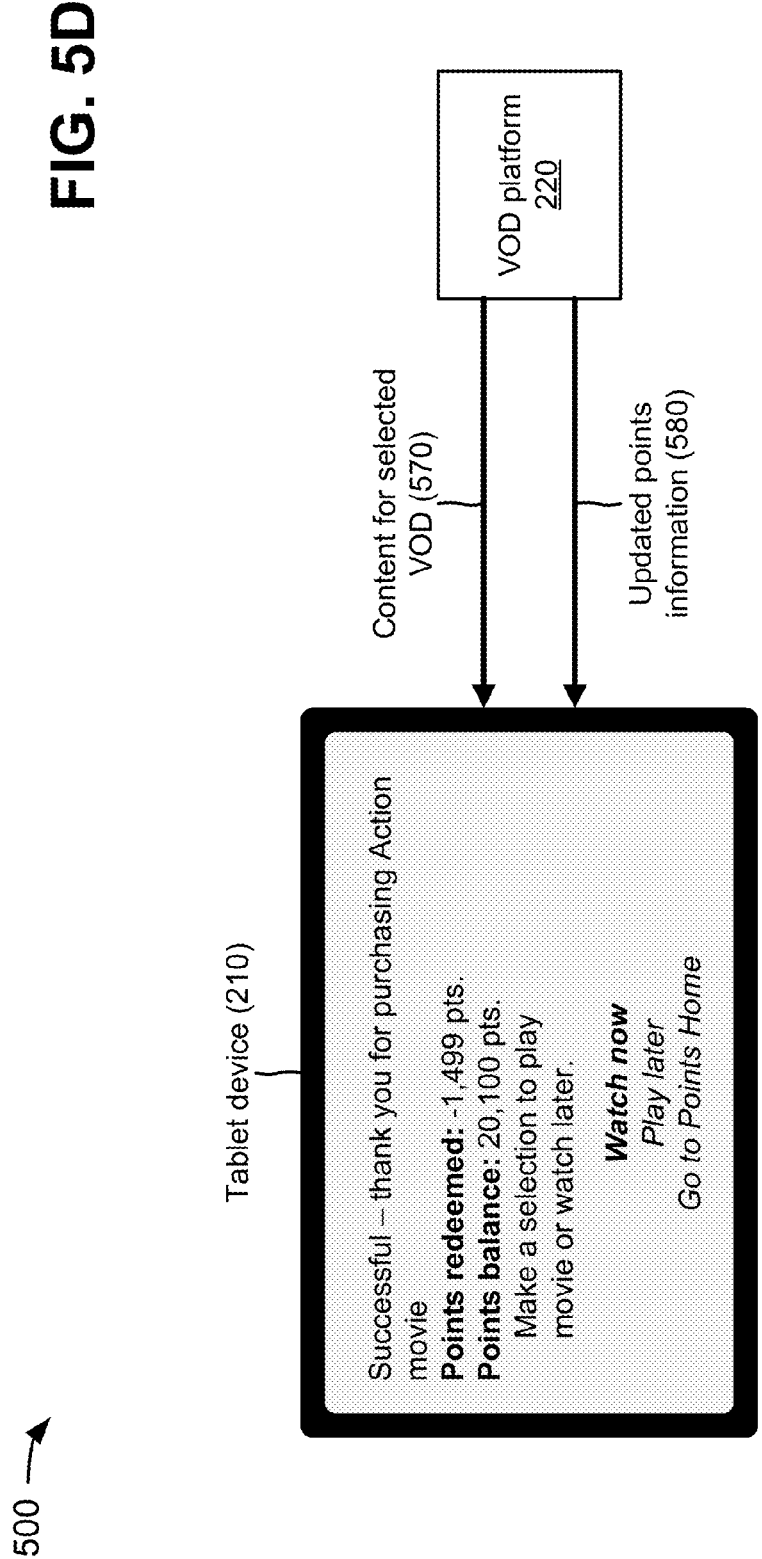
Figure 7A:
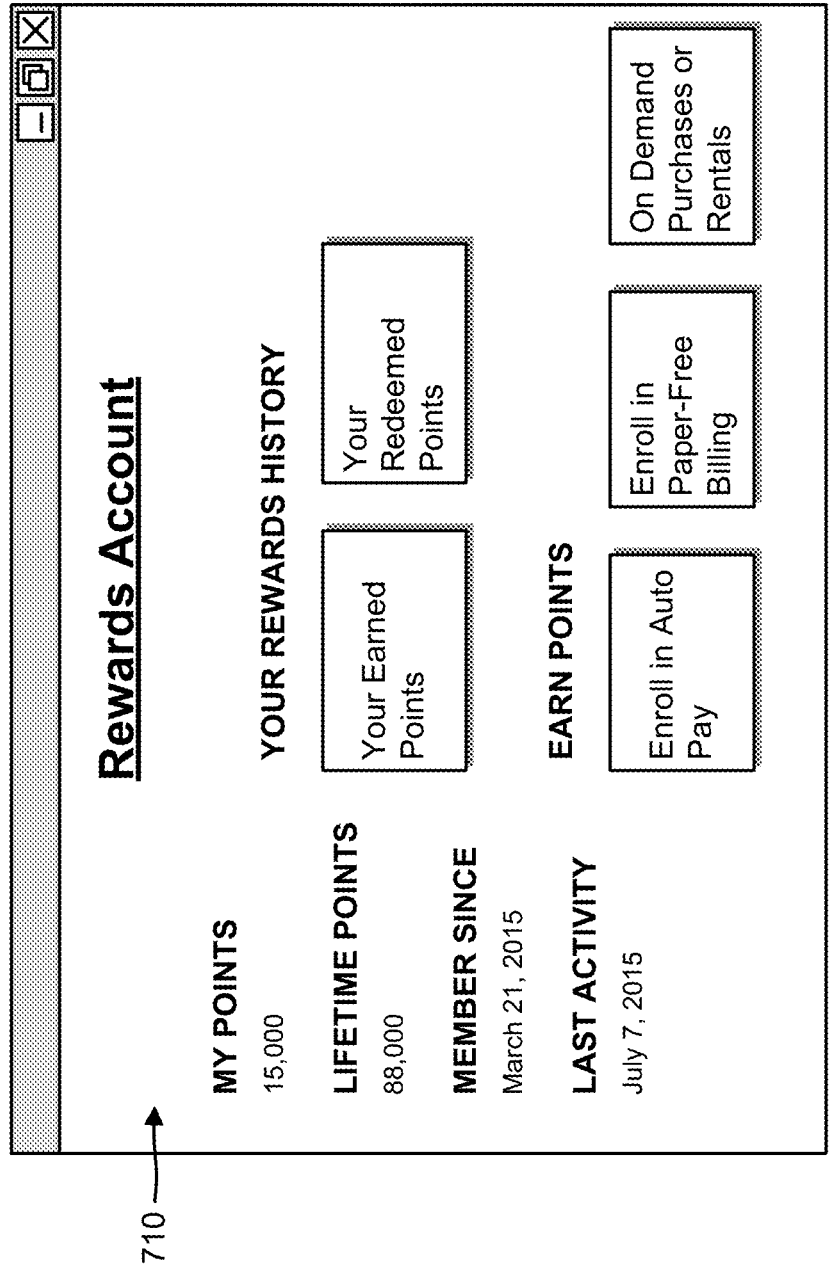

As shown in FIG. 5D, based on indication 560, VOD platform 220 may provide content 570 for the Action movie to tablet device 210. Tablet device 210 may receive the Action movie content 570, and may store the Action movie content 570. Based on indication 560, VOD platform 220 may determine updated points information 580, and provide updated points information 580 to tablet device 210. Tablet device 210 may receive updated points information 580, and may display updated points information 580 in a user interface. As shown in the user interface, updated points information 580 may indicate that the user successfully purchased the Action movie, redeemed 1,499 points to purchase the Action movie, and has 20,100 points remaining. The user interface may also enable the user to watch the Action movie, play the Action movie at a later time, and/or switch to a home page associated with the user's points account. If the user elects to watch the Action movie, tablet device 210 may begin playing the Action movie. If the user elects to watch the Action movie later, tablet device 210 may return to the user interface depicted in FIG. 5A. If the user elects to switch to the home page associated with the user's points account, tablet device 210 may display a user interface as shown in FIG. 7A, described below.

As indicated above, FIGS. 5A-5D are provided merely as an example. Other examples are possible and may differ from what was described with regard to FIGS. 5A-5D. In some implementations, the various operations described in connection with FIGS. 5A-5D may be performed automatically or at the request of a user.

Figure 6A:
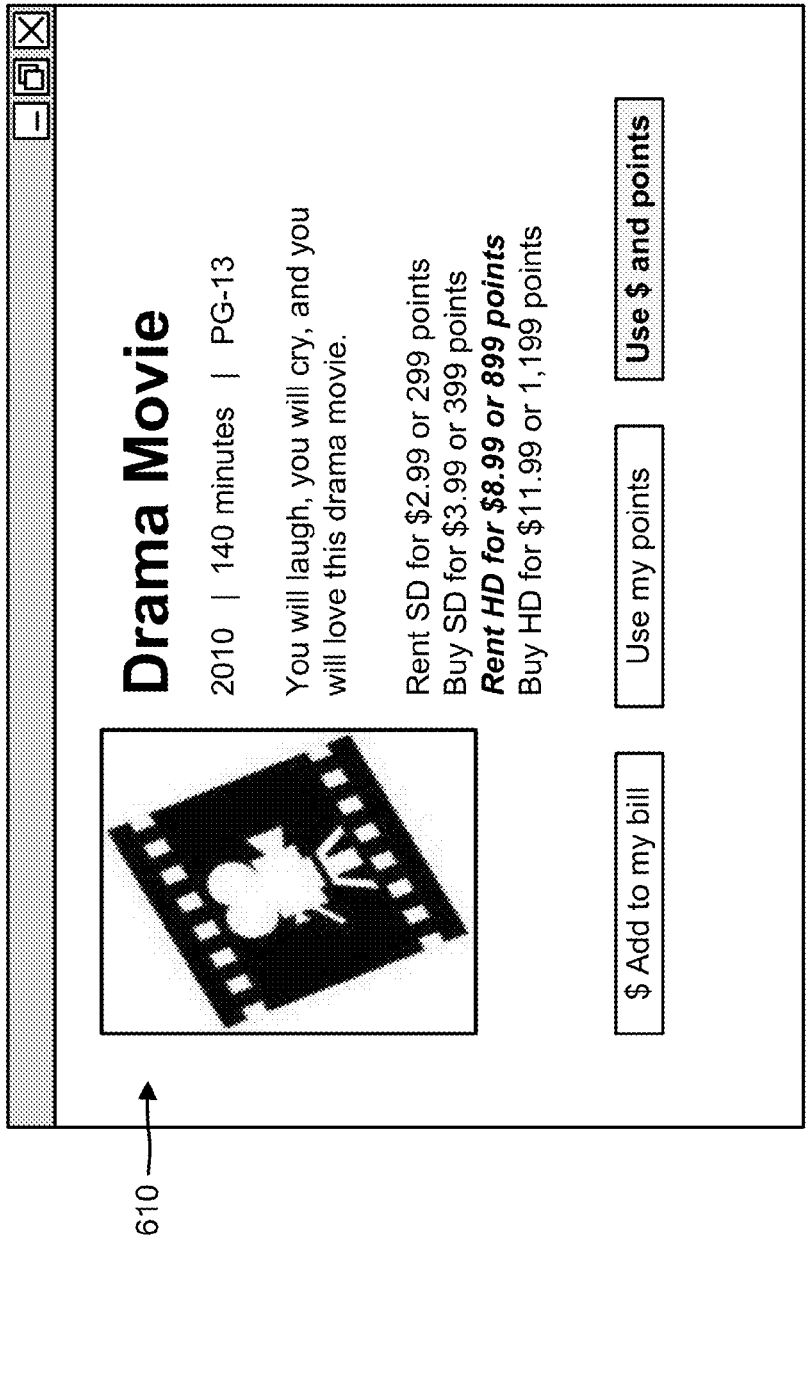
FIGS. 6A and 6B are diagrams of example user interfaces relating to the example process shown in FIG. 4.
Figure 6B:
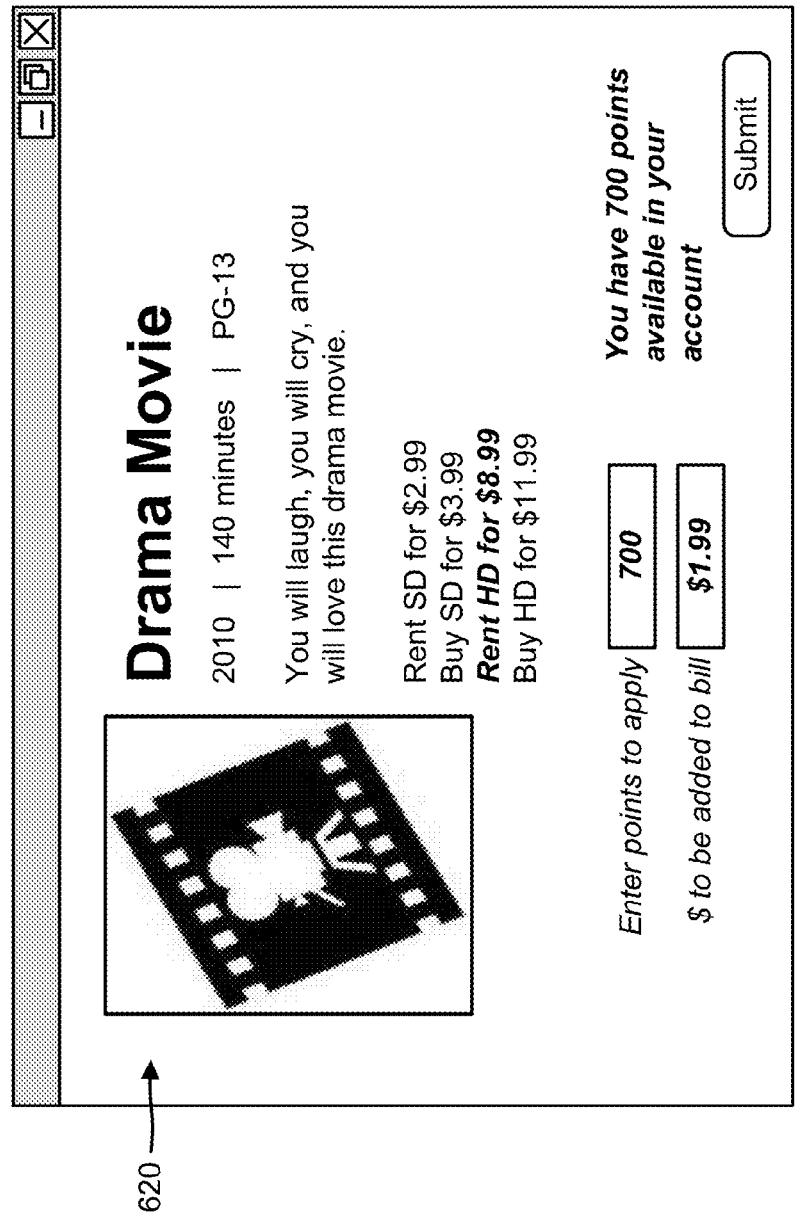

FIGS. 6A and 6B are diagrams of example user interfaces 600 relating to example process 400 shown in FIG. 4. With reference to FIG. 6A, assume that a user utilizes user device 210 to access a web page provided by VOD platform 220, and selects a Drama Movie from the web page provided by VOD platform 220. When the user selects the Drama Movie, VOD platform 220 may provide information associated with the Drama Movie and points-based purchase and rental options for the Drama Movie to user device 210. User device 210 may receive the information associated with the Drama Movie and the points-based purchase and rental options for the Drama Movie, and may display the information associated with the Drama Movie and the points-based purchase and rental options for the Drama Movie in a user interface 610, as shown in FIG. 6A.

As shown in user interface 610, the information associated with the Drama Movie may include a release date (e.g., 2010) for the Drama Movie, a duration (e.g., 140 minutes) of the Drama Movie, a parental rating (e.g., PG-13) for the Drama Movie, and a description of the Drama Movie. As further shown in user interface 610, the points-based purchase and rental options may include a SD rental option for the Drama Movie that costs $2.99 or 299 points; a SD purchase option for the Drama Movie that costs $3.99 or 399 points; a HD rental option for the Drama Movie that costs $8.99 or 899 points; and a HD purchase option for the Drama Movie that costs $11.99 or 1,199 points. The points-based purchase and rental options may also include an option to add a purchase or rental cost of the Drama Movie to the user's bill, an option to use points for the purchase or rental cost of the Drama Movie, and an option to use money and points for the purchase or rental cost of the Drama Movie. Assume that the user elects to rent the HD format of the Drama Movie and to use money and points for the rental of the HD format of the Drama Movie.

Based on the user's elections, user device 210 may display a user interface 620, as shown in FIG. 6B. As shown, user interface 620 may include information indicating a number of points available to the user, a field to enter points to apply for the rental of the HD format of the Drama Movie, a field to enter a dollar amount to add to the user's bill for the rental of the HD format of the Drama movie, and a Submit selection mechanism (e.g., a button, a pull-down menu, an icon, a hyperlink, or the like). Assume that the user has 700 available points, and elects to utilize the 700 available points for the rental of the Drama Movie. Further, assume that user wishes add a balance of $1.99, for the rental of the Drama Movie, to the user's bill. The user may select the Submit button, and VOD platform 220 may deduct 700 points from the user's account and may add a $1.99 charge to the user's bill. The $1.99 charge may be included the user's periodic (e.g., monthly) bill and may be added to other charges incurred by the user for a particular month. VOD platform 220 may generate the monthly bill, and provide the monthly bill to the user (e.g., electronically or via paper billing).

As indicated above, FIGS. 6A and 6B are provided merely as an example. Other examples are possible and may differ from what was described with regard to FIGS. 6A and 6B. In some implementations, the various operations described in connection with FIGS. 6A and 6B may be performed automatically or at the request of a user.

FIGS. 7A-7C are diagrams of example user interfaces 700 associated with a points-based system (e.g., a loyalty program) for purchasing and/or renting video on demand. Assume that a user utilizes user device 210 to access a home page associated with the user's points account, as provided by VOD platform 220. User device 210 may display the home page in a user interface 710, as shown in FIG. 7A. As shown, user interface 710 may include a number of currently available points for the user (e.g., 15,000); a number of lifetime points received by the user (e.g., 88,000); an indication of when the user became a member of the loyalty program (e.g., Mar. 21, 2015); an indication of when the user last utilized the loyalty program (e.g., Jul. 7, 2015); a rewards history section that includes the user's earned points and the user's redeemed points; and a earn points section that describes ways for the user to earn additional points (e.g., by enrolling in automatic bill payment, by enrolling in paper-free billing, by purchasing or renting on demand content, or the like). In some implementations, the loyalty program may include membership tiers (e.g., Gold, Silver, or the like), where members associated with better tiers may purchase and rent VOD content for fewer points, may earn points more quickly, or the like than members associated with less tiers.

Assume that the user utilizes user interface 710 of FIG. 7A to select the user's earned points in the rewards history section. Based on the selection, VOD platform 220 may provide and user device 210 may display a user interface 720 as shown in FIG. 7B. As shown, user interface 720 may include information associated with the user's earned points, such as, for example, descriptions of actions taken by the user to earn points (e.g., enroll in automatic bill payment, VOD purchase, or the like); dates associated with the actions taken by the user to earn points; points earned by the user for each of the actions taken by the user; a number of lifetime points earned by the user (e.g., 88,000); and a number of currently available points for the user (e.g., 15,000).

Now assume that the user utilizes user interface 710 of FIG. 7A to select the user's redeemed points in the rewards history section. Based on the selection, VOD platform 220 may provide and user device 210 may display a user interface 730 as shown in FIG. 7C. As shown, user interface 730 may include information associated with the user's redeemed points, such as, for example, descriptions of actions taken by the user that redeem points (e.g., an on demand purchase, a gift card purchase, or the like); dates associated with the actions taken by the user that redeem points; points redeemed by the user for each of the actions taken by the user; a number of points redeemed by the user (e.g., 73,000); and a number of currently available points for the user (e.g., 15,000).

As indicated above, FIGS. 7A-7C are provided merely as an example. Other examples are possible and may differ from what was described with regard to FIGS. 7A-7C. In some implementations, the various operations described in connection with FIGS. 7A-7C may be performed automatically or at the request of a user.

Systems and/or methods, described herein, may provide a VOD platform that enables VOD content to be purchased or rented using points associated with a loyalty program offered by the VOD platform, rather than or in addition to a monetary fee. The systems and/or methods may reward customer loyalty with the points, and may enable a VOD content provider to retain customers. The systems and/or methods may award points based on specific customer behavior, may increase customer satisfaction, and may encourage customers to purchase or rent VOD content. The points may increase participation in the loyalty program, which may save processing resources associated with VOD platform 220 since VOD platform 220 may not have to generate a bill for purchases and/or rentals, verify a user for payment of purchases and/or rentals, verify payment for purchases and/or rentals, or the like; and since the points can be used to purchase other services the conserve processing resources, such as automatic billing, electronic billing, or the like.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
providing, by a device and to a user device, information associated with video on demand,
the information associated with the video on demand including a list of video on demand available for purchase or rental from the device;
receiving, by the device and from the user device, an indication of a selected video on demand from the information associated with the video on demand;
providing, by the device and to the user device, points-based purchase or rental options for the selected video on demand,
the points-based purchase or rental options including points associated with a loyalty program provided by the device for a user of the user device,
the points-based purchase or rental options including an option to purchase or rent the selected video on demand based on a combination of points and a monetary fee;
receiving, by the device and from the user device, information associated with a selection of the option to purchase or rent the selected video on demand based on the combination of the points and the monetary fee, from the points-based purchase or rental options;
providing, by the device and to the user device, a user interface that includes a first field for receiving a first input associated with the points to apply for the selected video on demand, and a second field for receiving a second input associated with the monetary fee to apply for the selected video on demand, based on receiving the information associated with the selection;
receiving, by the device and from the user device, the points to apply for the selected video on demand, via the first field of the user interface, and the monetary fee to apply for the selected video on demand, via the second field of the user interface; and
providing, by the device and to the user device, content for the selected video on demand based on receiving the points to apply for the selected video on demand and the monetary fee to apply for the selected video on demand.

2. The method of claim 1, further comprising:
updating the points associated with the loyalty program based on the points to apply for the selected video on demand and to generate updated points; and
providing information associated with the updated points to the user device.

3. The method of claim 1, where the content for the selected video on demand includes a standard definition format of the content and a high definition format of the content.

4. The method of claim 1, where, when the information associated with the selection of the option to purchase or rent includes the selection of the option to rent, the method further comprises:
providing the content for the selected video on demand, to the user device, for a rental time period.

5. The method of claim 1, where, when the information associated with the selection of the option to purchase or rent includes the selection of the option to purchase, the method further comprises one of:
downloading the content for the selected video on demand to the user device; or
associating the content for the selected video on demand with the user to enable the user device to access the content at any time.

6. The method of claim 1, where the points-based purchase or rental options include:
a first option to purchase or rent the selected video on demand based on the points, and
a second option to purchase or rent the selected video on demand based on the monetary fee.

7. The method of claim 1, where the selected video on demand includes one of:
pay per view content,
a television episode,
on demand video content,
on demand audio content, or
on demand game content.

8. A device, comprising:
one or more processors to:
provide, to a user device, a list of on demand content available for purchase or rental from the device;
receive, from the user device, an indication of a selected on demand content from the list of on demand content;
provide, to the user device, points-based purchase or rental options for the selected on demand content,
the points-based purchase or rental options including points associated with a loyalty program provided by the device for a user of the user device;
the points-based purchase or rental options including an option to purchase or rent the selected on demand content based on a combination of points and a monetary fee;
receive, from the user device, information associated with a selection of the option to purchase or rent the selected on demand content based on the combination of the points and the monetary fee, from the points-based purchase or rental options;

provide, to the user device, a user interface that includes a first field for receiving a first input associated with the points to apply for the selected on demand content, and a second field for receiving a second input associated with the monetary fee to apply for the selected on demand content, based on receiving the information associated with the selection;

receive, from the user device, the points to apply for the selected on demand content, via the first field of the user interface, and the monetary fee to apply for the selected on demand content, via the second field of the user interface; and provide, to the user device, the selected on demand content based on receiving the points to apply for the selected on demand content and the monetary fee to apply for the selected on demand content.

9. The device of claim 8, where the one or more processors are further to:
redeem the points associated with the loyalty program based on the points to apply for the selected on demand content and to generate redeemed points; and
provide information associated with the redeemed points to the user device.

10. The device of claim 8, where the selected on demand content includes a standard quality format and a high quality format.

11. The device of claim 8, where, when the information associated with the selection of the option to purchase or rent includes the selection of the option to rent, the one or more processors are further to:
provide the selected on demand content, to the user device, for a rental time period.

12. The device of claim 8, where, when the information associated with the selection of the option to purchase or rent includes the selection of the option to purchase, the one or more processors are further to one of:
enable the user device to download the selected on demand content; or
associate the selected on demand content with the user to enable the user device to access the selected on demand content at any time.

13. The device of claim 8, where the points-based purchase or rental options include:
a first option to purchase or rent the selected on demand content based on the points, and
a second option to purchase or rent the selected on demand content based on the monetary fee.

14. The device of claim 8, where the selected on demand content includes one of:
pay per view content,
a television episode,
on demand video content,
on demand audio content, or
on demand game content.

15. A non-transitory computer-readable medium for storing instructions, the instructions comprising:
one or more instructions that, when executed by one or more processors of a device, cause the one or more processors to:
provide, to a user device, a list of on demand content available for purchase or rental from the device;
receive, from the user device, an indication of a selected on demand content from the list of on demand content;
provide, to the user device, points-based purchase or rental options for the selected on demand content,
the points-based purchase or rental options including points associated with a loyalty program provided by the device for a user of the user device;
the points-based purchase or rental options including an option to purchase or rent the selected on demand content based on a combination of points and a monetary fee;
receive, from the user device, information associated with a selection of the option to purchase or rent the selected on demand content based on the combination of the points and the monetary fee, from the points-based purchase or rental options;
provide, to the user device, a user interface that includes a first field for receiving a first input associated with the points to apply for the selected on demand content, and a second field for receiving a second input associated with the monetary fee to apply for the selected on demand content, based on receiving the information associated with the selection;
receive, from the user device, the points to apply for the selected on demand content, via the first field of the user interface, and the monetary fee to apply for the selected on demand content, via the second field of the user interface;
update the points associated with the loyalty program based on the points to apply for the selected on demand content and to generate updated points; and
provide, to the user device, information associated with the updated points and content for the selected on demand content.

16. The non-transitory computer-readable medium of claim 15, where the content for the selected on demand content includes a standard quality format of the content and a high quality format of the content.

17. The non-transitory computer-readable medium of claim 15, where, when the information associated with the selection of the option to purchase or rent includes the selection of the option to rent, the one or more instructions, when executed by the one or more processors, further cause the one or more processors to:
provide the content for the selected on demand content, to the user device, for a rental time period.

18. The non-transitory computer-readable medium of claim 15, where, when the information associated with the selection of the option to purchase or rent includes the selection of the option to purchase, the one or more instructions, when executed by the one or more processors, further cause the one or more processors to:
enable the user device to download the content for the selected on demand content.

19. The non-transitory computer-readable medium of claim 15, where the selected on demand content includes a group of movies.

20. The non-transitory computer-readable medium of claim 15, where the points-based purchase or rental options include:
a first option to purchase or rent the selected on demand content based on the points, and
second option to purchase or rent the selected on demand content based on the monetary fee.

* * * * *